United States Patent
Howard et al.

(10) Patent No.: US 6,745,106 B2
(45) Date of Patent: Jun. 1, 2004

(54) TONE GENERATING ELECTRONIC DEVICE WITH PAGING MODULE FOR VERIFICATION OF ENERGY CURTAILMENT

(75) Inventors: Michael L. Howard, Sandy, UT (US); William R. Harper, Jr., Salt Lake City, UT (US); Todd H. Rytting, West Valley City, UT (US)

(73) Assignee: emWare, Inc., Salt Lake City, UT (US)

( * ) Notice: Subject to any disclaimer, the term of this patent is extended or adjusted under 35 U.S.C. 154(b) by 22 days.

(21) Appl. No.: 09/946,080

(22) Filed: Sep. 4, 2001

(65) Prior Publication Data

US 2003/0045968 A1 Mar. 6, 2003

(51) Int. Cl.[7] .............................................. G06F 15/16
(52) U.S. Cl. ......................................... 700/276; 340/7.1
(58) Field of Search ................................. 700/275–278, 700/295; 340/7.1–7.2, 7.24–7.29, 7.31, 7.39, 7.43, 7.49, 286.01, 286.02

(56) References Cited

U.S. PATENT DOCUMENTS

| | | | |
|---|---|---|---|
| 5,544,036 A | | 8/1996 | Brown, Jr. et al. ......... 364/145 |
| 5,595,342 A | * | 1/1997 | McNair et al. ................ 236/51 |
| 5,608,655 A | | 3/1997 | Moughanni et al. .... 364/514 R |
| 5,640,153 A | | 6/1997 | Hildebrand et al. ... 340/825.06 |
| 5,926,776 A | * | 7/1999 | Glorioso et al. ............ 702/130 |
| 6,147,601 A | | 11/2000 | Sandelman et al. ......... 340/506 |
| 6,160,477 A | | 12/2000 | Sandelman et al. ......... 340/506 |
| 6,211,782 B1 | | 4/2001 | Sandelman et al. ......... 340/506 |
| 6,260,765 B1 | * | 7/2001 | Natale et al. .................. 236/47 |
| 6,519,509 B1 | * | 2/2003 | Nierlich et al. ............. 700/286 |
| 2002/0125998 A1 | * | 9/2002 | Petite et al. ........... 340/286.01 |
| 2002/0196124 A1 | * | 12/2002 | Howard et al. .............. 340/7.1 |
| 2003/0027593 A1 | * | 2/2003 | Howard et al. ............. 455/557 |
| 2003/0036822 A1 | * | 2/2003 | Davis et al. ................. 700/295 |

OTHER PUBLICATIONS

The Authoritative Dictionary of IEEE Standards Terms 2000, 7th edition, Standards Information Network IEEE Press, pp. 342–343.*

Jo Posti, Motorola's CreataLink 2XT Two–Way Data Transceiver Now Available For Additional ReFLEX Systems, Copyright 2000 Motorola, Inc.*

Jo Posti, Motorola Brings Wireless Remote Control And Monitoring To Broad Array of Industrial Applications, Copyright 2000 Motorola, Inc.*

Austin Energy Web page, "Become a Power Partner with Austin Energy", pp. 1–2, printed Jun. 6, 2001.

Austin Energy Web page, "Honeywell Superstat", pp. 1–2, printed Jun. 6, 2001.

(List continued on next page.)

Primary Examiner—Leo Picard
Assistant Examiner—Sean P. Shechtman
(74) Attorney, Agent, or Firm—Madson & Metcalf

(57) ABSTRACT

A curtailment module is disclosed for enabling an energy provider to send a request to curtail energy use to a user. The curtailment module includes an interface for electronic communications with a temperature control device. A paging module is used to receive the request from the energy provider through a paging network. The curtailment module also includes a processor in electronic communication with the paging module for receiving the request from the paging module. Memory is also included and is in electronic communication with the processor for storing a curtailment message and history data. The curtailment module also includes a sound component in electronic communication with the processor for outputting an audio verification. A code generator is stored in the memory and executable by the processor to generate a verification code using the curtailment message and the history data as inputs. The code generator also generates the audio verification based on the verification code to verify whether the request was followed.

26 Claims, 8 Drawing Sheets

OTHER PUBLICATIONS

Honeywell Web page, "Energy Management", p. 1, printed Jun. 6, 2001.

Honeywell Web page, "Remote Control for Your Home's Heating/Cooling System", pp. 1–2, printed Jun. 6, 2001.

Honeywell Web page, "Honeywell Home Controller Gateway", pp. 1–2, printed Jun. 6, 2001.

Honeywell Web page, Your Home: Performance and Monitoring, pp. 1–3, printed Jun. 6, 2001.

Honeywell Web page, "Home Controller User Guide", Product Release Version 1.0.x, pp. 1–39, Copyright 2000, Honeywell, Inc.

* cited by examiner the paging module for receiving the request from the paging module. Memory is also included and is in electronic communication with the processor for storing a curtailment message and history data. The curtailment module also includes a sound component in electronic communication with the processor for outputting an audio verification. A code generator is stored in the memory and executable by the processor to generate a verification code using the curtailment message and the history data as inputs. The code generator also generates the audio verification based on the verification code to verify whether the request was followed.

TONE GENERATING ELECTRONIC DEVICE WITH PAGING MODULE FOR VERIFICATION OF ENERGY CURTAILMENT

TECHNICAL FIELD

This invention relates generally to electronic devices, and is more particularly directed toward systems and methods for requesting energy curtailment through the use of communications with an electronic device.

BACKGROUND

Blackouts are sometimes caused because of a failure of the utility company's power system. Sometimes a failure is caused by a malfunction in the system. In addition, certain events (e.g., a hurricane, tornado, lightning storm, etc.) can damage parts of the system that in turn result in a blackout or partial blackout. However, sometimes blackouts can be caused by a demand for power resources that exceeds the supply of power available. In times of peak usage, energy providers may be susceptible to blackouts or brownouts because of power shortages. Blackouts or brownouts may be avoided by instructing users of the system to reduce their power consumption during power shortages. In addition, power may be conserved by requesting that users of the system reduce their power consumption. It would be beneficial to use modern computer and communications technology to reduce the likelihood of power outages or shortages.

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

Embedded systems may be used to control or monitor the use of certain resources. For example, an embedded system may be used to control and/or monitor the power used, the water used, the temperature, the lighting, etc. Benefits may be realized through the use of embedded systems to control and/or monitor the use of resources.

SUMMARY OF THE INVENTION

A curtailment module is disclosed for enabling an energy provider to send a request to curtail energy use to a user. The curtailment module includes an interface for electronic communications with a temperature control device. A paging module is used to receive the request from the energy provider through a paging network. The curtailment module also includes a processor in electronic communication with the paging module for receiving the request from the paging module. Memory is also included and is in electronic communication with the processor for storing a curtailment message and history data. The curtailment module also includes a sound component in electronic communication with the processor for outputting an audio verification. A code generator is stored in the memory and executable by the processor to generate a verification code using the curtailment message and the history data as inputs. The code generator also generates the audio verification based on the verification code to verify whether the request was followed.

The memory of the curtailment module may be programmed for particular tasks. For example, the memory may be programmed with instructions to cause the curtailment module to receive the request from the energy provider. In addition, the memory may be programmed with instructions for communicating with the temperature control device. Further, the memory may be programmed to cause the processor to store history data relating to the temperature control device. The memory may also be programmed with instructions to generate a verification code to verify whether the request was followed. The verification code instructions may use a device ID, the history data and/or a curtailment message in generating the verification code.

Embodiments of the curtailment module may also include a display for outputting information to the user and an input device for enabling the user to enter a user input. The verification code may be displayed to the user using the display.

The sound component may include a speaker. The code generator may cause audio verification sound to be output through the speaker. Further, the code generator may cause DTMF sound to be output through the speaker.

The temperature control device may be used to control the temperature of a structure remotely located from the energy provider. The structure broadly includes any structure at a location that uses a heating unit and/or a cooling unit to affect the temperature of the structure.

Various embodiments of the curtailment module are contemplated. For example, in one embodiment the curtailment module may be a combination temperature-control curtailment module. The combination temperature-control curtailment module may be used by a user to control the temperature. In addition, the combination temperature-control curtailment module may be used for enabling an energy provider to send a curtailment message to a remote structure and for verifying whether the user curtailed his or her energy use.

A method is also disclosed for requesting that energy use be curtailed at the structure and for verifying curtailment. The method includes creating a curtailment message to send to the structure, sending the curtailment message to the structure through a pager network, receiving the curtailment message by a curtailment module at the structure, displaying the curtailment message at the structure, monitoring the temperature control device in electronic communication with the curtailment module, saving history data that relates to settings from the temperature control device, generating a verification code that verifies whether the curtailment message was followed, generating an audio verification based on the verification code, and displaying the verification code at the structure for the user.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
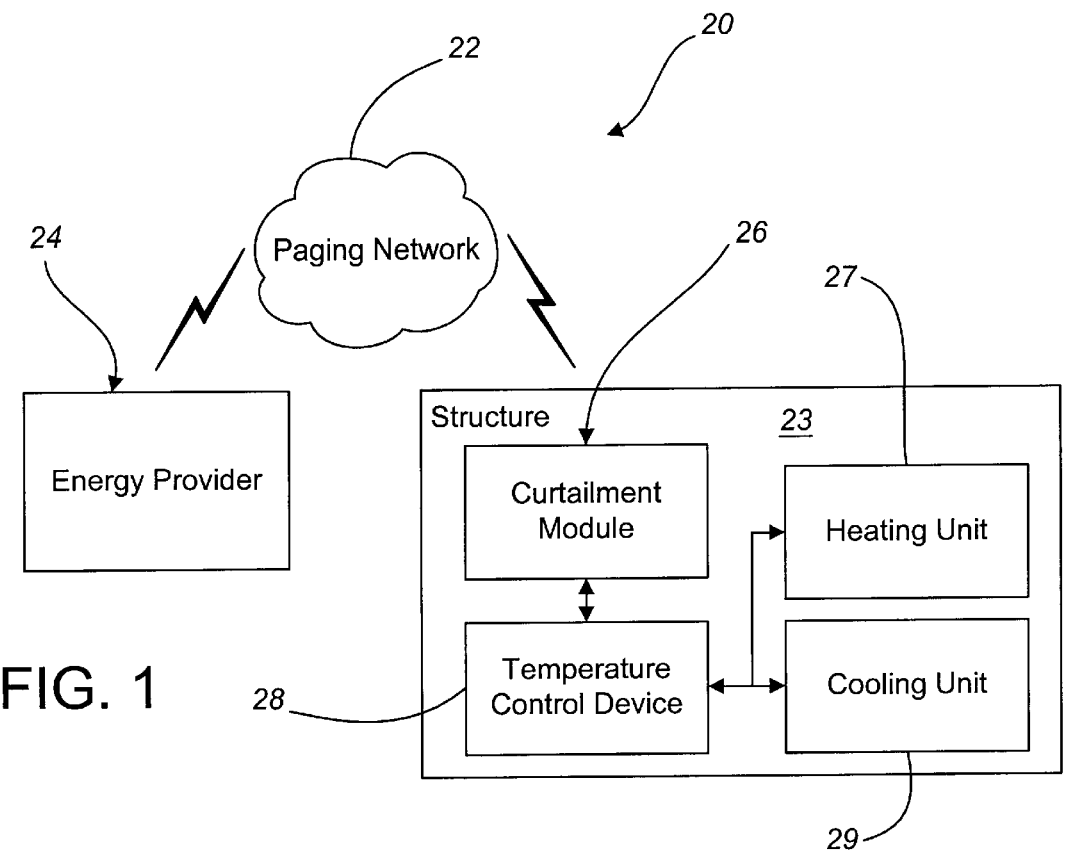
FIG. 1 is a block diagram of an embodiment illustrating the use of a paging network to request energy curtailment.

FIG. 1 is a block diagram of an embodiment of a system 20 illustrating the use of a paging network 22 to request energy curtailment by a user at a particular structure 23 at a location. An energy provider 24 (e.g., a power company, a utility company, etc.) may desire to request that its users curtail or decrease their power consumption at a particular time or times. For example, an energy provider 24 may desire to request that its users decrease their power consumption by a particular amount at peak use times. Energy providers 24 may request the curtailment through a specific request relating to the use of temperature control of the structure 23. As will be explained below, such a request may ask the user to reduce the use of an air conditioner or the use of a heater in order to save energy.

The structure 23 refers to any structure that uses energy to control the temperature of the structure. For example, a structure 23 may be a home, a garage, an office, a warehouse, a studio, an arena, a store, etc.

To request curtailment, the energy provider 24 may send a page to a curtailment module 26 at the structure 23 to request a curtailment. As shown in FIG. 1, the curtailment module 26 may be a separate component in relation to the temperature control device 28. Typically users will already have a temperature control device 28 (e.g., a thermostat) at their location. The curtailment module 26 receives the curtailment request from the paging network 22 and notifies the user of the request. The curtailment module 26 also is in communication with the temperature control device 28 to verify curtailment.

The temperature control device 28 may be in electronic communication with a heating unit 27 and/or a cooling unit 29. The heating unit 27 and the cooling unit 29 operate to affect the temperature of the structure 23.

Figure 2:
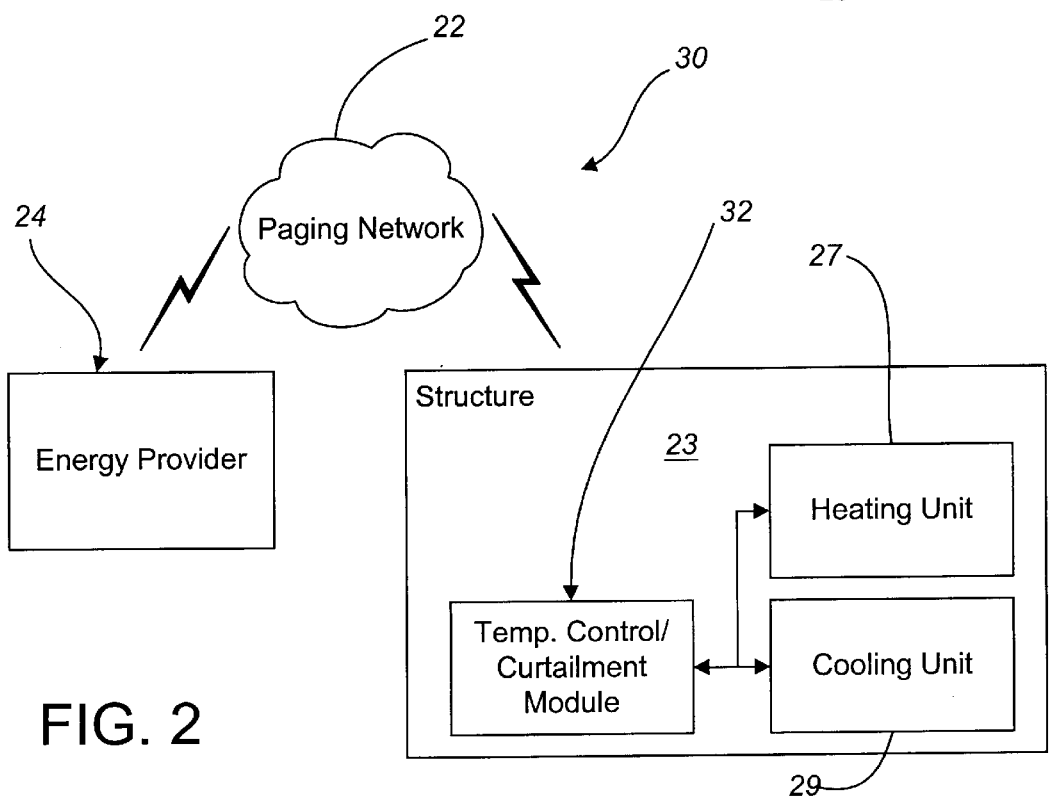
FIG. 2 is a block diagram of another embodiment illustrating the use of a paging network to request energy curtailment.

FIG. 2 is a block diagram of another embodiment of a system 30 illustrating the use of a paging network 22 to request energy curtailment. FIG. 2 illustrates a combined temperature control device and curtailment module 32. Those skilled in the art will appreciate that the hardware and/or software components of the curtailment module 26 may be combined with a temperature control device 28 for a combination temperature control device and curtailment module 32. The combination temperature control device and curtailment module 32 is in electronic communication with the heating unit 27 and/or the cooling unit 29.

Figure 3:
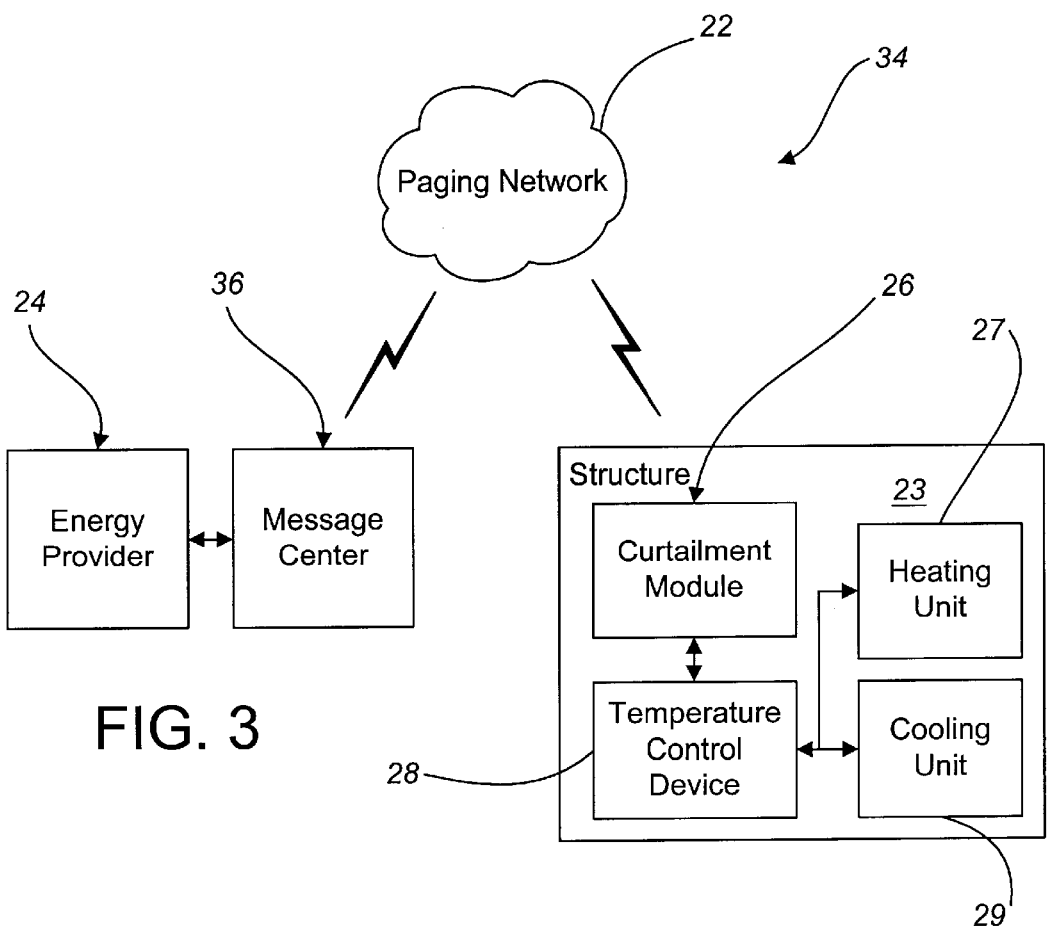
FIG. 3 is a block diagram of an embodiment illustrating the use of a message center and paging network to request energy curtailment.

FIG. 3 is a block diagram of an embodiment of a system 34 illustrating the use of a message center 36 and paging network 22 to request energy curtailment. The message center 36 may be provided to handle the sending of messages through the paging network 22 to the curtailment modules 26 at various structures 23. The message center 36 will be more fully discussed below.

Figure 4:
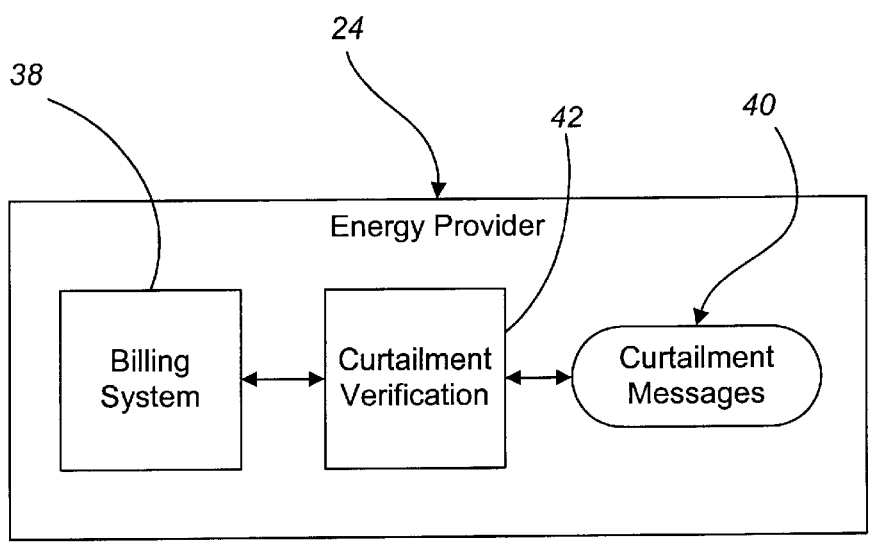
FIG. 4 is a block diagram of an embodiment of an energy provider.

FIG. 4 is a block diagram of an embodiment of an energy provider 24. Many energy providers 24 are in existence and use commercially available billing systems 38 for billing users for the use of power or energy. Thus, those skilled in the art will appreciate the various types of billing systems 38 that may be used by an energy provider 24.

The energy provider 24 includes curtailment messages 40. The curtailment messages 40 allow an embodiment of an energy provider 24 to verify curtailment for users and give any due credit to the user. The curtailment verification 42 functionality verifies whether the user actually curtailed his or her power or energy use. As will be disclosed below, a code may be generated that can be used to verify curtailment. The curtailment verification 42 functionality may perform similar steps as will be described herein to verify curtailment.

Figure 5:
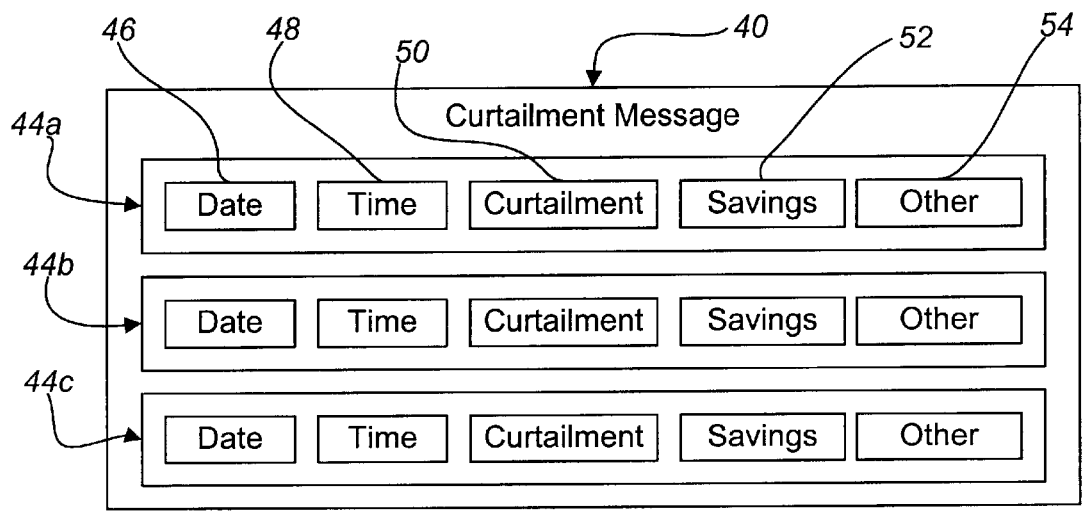
FIG. 5 is a block diagram of an embodiment of a curtailment message.

FIG. 5 is a block diagram of an embodiment of a curtailment message 40. A curtailment message 40 may include several curtailment requests 44. For example, FIG. 5 illustrates three curtailment requests 44a, 44b, 44c in the curtailment message 40. Each curtailment request 44 of the embodiment shown in FIG. 5 illustrates data fields included in the request 44. The data includes fields for the date 46 of the requested curtailment, for the time(s) 48 of the curtailment, the curtailment 50, and the savings 52 to the user should the user curtail as requested. Other 54 data fields may also be included in the curtailment request 44 as needed. The curtailment field 50 indicates what curtailment is being requested. For example, the curtailment field 50 may indicate to the user to reduce his or her power or energy consumption by a certain percent. Alternatively, the curtailment field 50 may indicate to the user to change the setting on his or her thermostat by a specific amount. Those skilled in the art will appreciate the various types of curtailment requests that could be made. The savings field 52 indicates to the user what the savings or credits will be if the curtailment is followed. For example, the savings may be a reduction of the cost to the user by a certain percent. Alternatively, it may be a rebate of a certain amount. Those skilled in the art will appreciate that various other types of savings and/or credits may be given to users for curtailing as requested.

Figure 6:
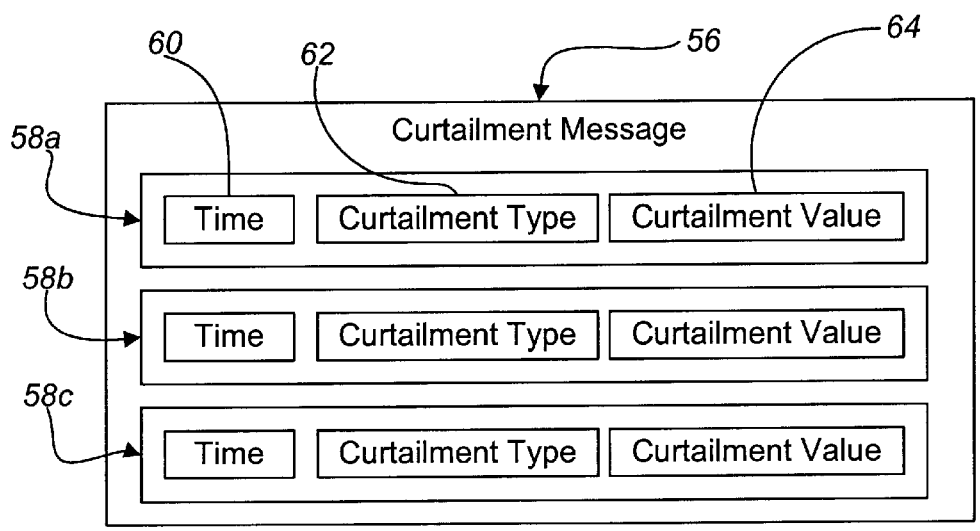
FIG. 6 is a block diagram of another embodiment of a curtailment message.

FIG. 6 is a block diagram of another embodiment of a curtailment message 56. The curtailment message 56 may include several curtailment requests 58. FIG. 6 illustrates three curtailment requests 58a, 58b, 58c in the curtailment message 56. Each curtailment request 58 of the embodiment shown in FIG. 6 also illustrates data fields included in the request 58. The data includes fields for the time(s) 60 of the curtailment, the curtailment type 62, and the curtailment value 64.

The time field 60 may be used to indicate at what time a curtailment should begin. Those skilled in the art will appreciate that the time field 60 may be formatted to include a number of beginning times and a number of ending times. If no date were included in the time field 60, the embodiment sending this message may be configured to send out curtailment messages on the day of the curtailment, or a specified number of days before the curtailment, such that the curtailment module 26 may obtain the date to be associated with the particular times. Alternatively, no date included may be used to indicate that the curtailment message 56 is effective for each day until a new curtailment message 56 is broadcast.

The curtailment type field 62 indicates what type of curtailment is being requested. For example, the curtailment type field 62 may indicate to the user to reduce his or her power or energy consumption by a certain percent. Alternatively, the curtailment type field 62 may indicate to the user to change the setting on his or her thermostat by a specific amount. Further, a variable curtailment type 62 may be requested indicating to the user that, depending on how much curtailing is accomplished, the user will realize proportionate savings. The curtailment value field 64 is associated with the curtailment type 62 to define the curtailment request. For example, if the curtailment type 62 indicated that the curtailment request was requesting a certain percentage reduction in power consumption associated with air conditioning a structure 23, the curtailment value 64 may be a number defining the exact percentage. By way of further example, if the curtailment type 62 indicated to a user to reduce the temperature setting on his or her thermostat by a fixed number of degrees, the curtailment value 64 may be used to define the fixed number (e.g., a curtailment value of 3 to define the fixed number of degrees to 3 degrees).

Figure 7:
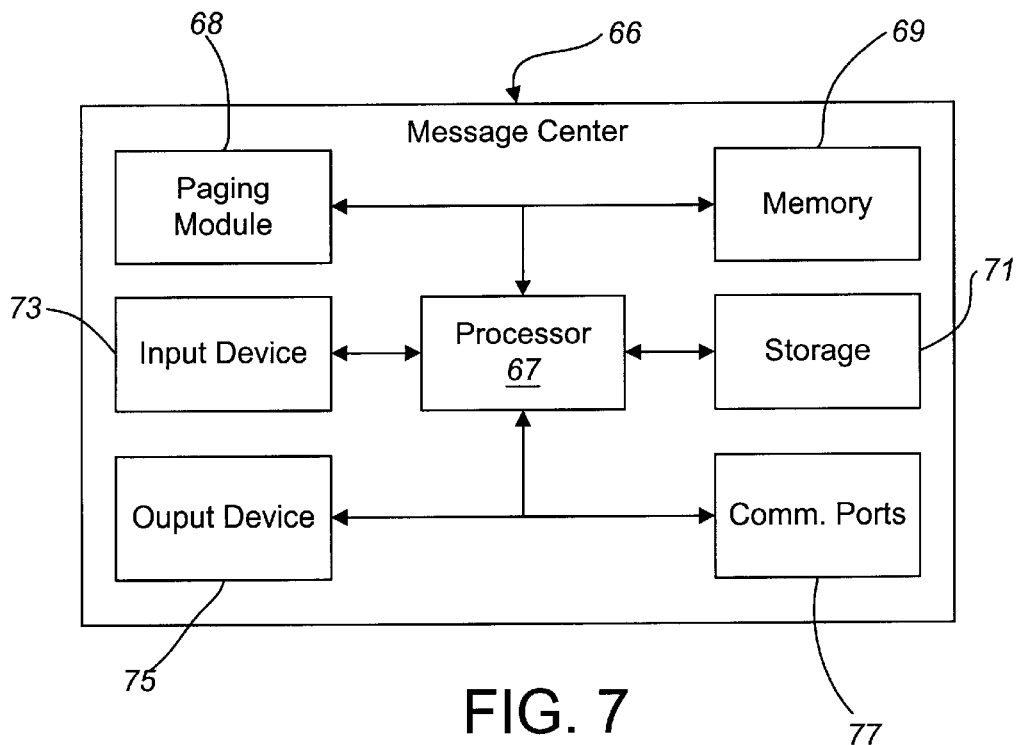
FIG. 7 is a block diagram illustrating hardware components of an embodiment of a message center.

FIG. 7 is a block diagram of hardware components that may be used in an embodiment of a message center 66. As illustrated in FIG. 3, a message center 66 may be used to handle the sending of messages through the paging network 22 to the curtailment modules 26 at various locations. The communications link between the energy provider 24 and the message center 36, 66 may be based on standard protocols and security.

The embodiment of a message center 66 shown in FIG. 7 communicates with the curtailment module(s) 26 through the paging network 22. One possible paging network 22 that may be used is the paging network provided by SkyTel Communications, Inc. Paging units/modules 68 that can communicate using paging networks 22 are commercially available.

The message center 66 may route messages to the network operations center (not shown) for the paging network 22. The use of paging networks and sending/receiving pages is known in the art.

The paging module 68 used to communicate with the curtailment module 26 may be configured for single direction paging (one-way paging) from the energy provider 24 and/or message center 66 to the curtailment module 26. Using one-way paging typically reduces the cost of the paging service and the components required to send and receive pages. Of course, it will be appreciated that two-way paging may be used.

A computer may be used to implement the message center 66. Many different types of computer systems may be used to implement the message center 66. The diagram of FIG. 7 illustrates typical components of a computer system including a processor 67, memory 69, a storage device 71, an input device 73, and an output device 75. One or more communication ports 77 may also be included in the message center 66. It will be appreciated by those skilled in the art that many more components may be included in the message center 66. For example, several input devices 73 may be included, such as a keyboard, a mouse, a joystick, a touchscreen, etc. In addition, several output devices may be included such as a monitor, speakers, a printer, etc. Thus, those skilled in the art will appreciate that many additional components may be added to the message center 66 without detracting from the functionality to serve as a message center 66.

Figure 8:
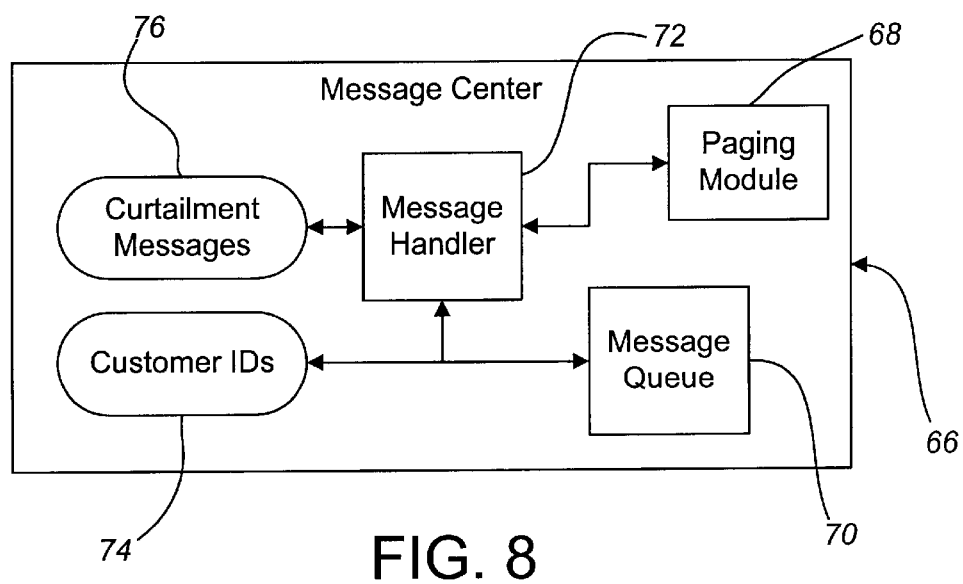
FIG. 8 is a block diagram illustrating software components of an embodiment of a message center.

FIG. 8 illustrates components of an embodiment of a message center 66 that may be implemented through software and/or stored data on the storage 71 or memory 69 of the message center 66. A message handler 72 may handle messages being communicated through the paging module 68 and paging network 22. The message handler 72 may read and write data to and from the paging module 68 in order to send and receive messages through the paging network 22.

The message center 66 may include a message queue 70 to queue up the curtailment messages 76 to be sent out, or to queue up messages being received.

Customer identifications 74 may be included at the message center 66 to identify the various customers that may receive curtailment messages 76. Customer identification data 74 may include as much information as the message center 66 and/or the energy provider 24 deem necessary or appropriate. For example, a customer identification may include the name of the customer (not shown), the address (not shown), the telephone number (not shown), the device identification, etc.

The curtailment messages 76 may also be stored at the message center 66. The curtailment messages 76 may include all the curtailment messages sent out, or it may only keep a certain number of messages that have been sent out.

Figure 9:
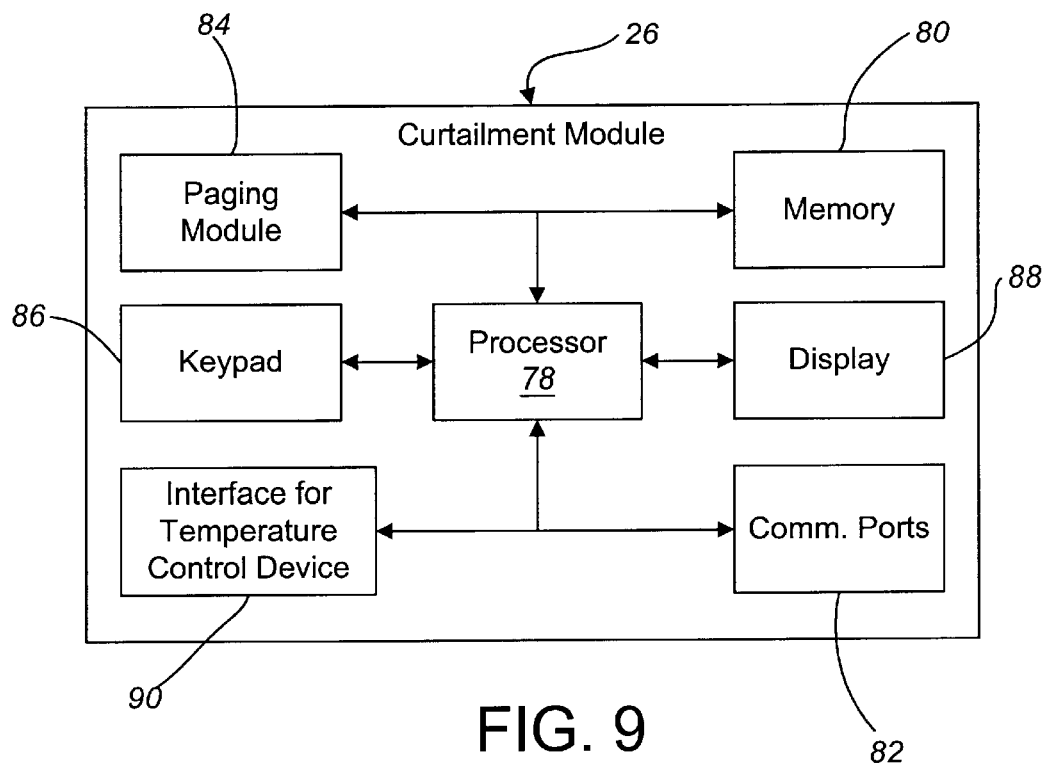
FIG. 9 is a block diagram illustrating hardware components of an embodiment of a curtailment module.

FIG. 9 is a block diagram illustrating hardware components of an embodiment of a curtailment module 26. An embodiment of a curtailment module 26 includes a processor 78 and memory 80. Those skilled in the art will appreciate the various types of processors and memory that can be used. For example, an embodiment of the curtailment module 26 may include a single-board computer that includes the processor 78 and memory 80. Such single-board computers are commercially available. Alternatively, the curtailment module 26 may include a microcontroller as the processor 78. In addition, embodiments of the curtailment module 26 may include flash memory.

The curtailment module 26 may also include communications ports 82. The communications ports 82 enable communication with other electronic devices. Those skilled in the art will appreciate the various types of communication ports that can be used with the embodiments herein.

A paging module 84 is included in the curtailment module 26 for communications through the paging network 22. Paging units or modules 84 that are capable of receiving pages through a paging network 22 are commercially available. One such commercially available pager communications module is the CreataLink receiver module available from Motorola, Inc.

The embodiment of FIG. 9 also includes a keypad 86 or a set of buttons or switches for input. Through the input means a user may navigate through menus, cause curtailment messages to be displayed, cause the verification code to be displayed, etc. The keypad 86, or any other input means that could be used with the curtailment module 26, is used by the user to enter user inputs. Other input means may include a touch screen, switches, sensors, a keyboard, a mouse, a joystick, etc. It will be appreciated by one skilled in the art that many different types of input means may be used with the curtailment module 26.

An embodiment of a curtailment module 26 may also include a display 88 or other output device to present information to the user. For example, when a curtailment message 40, 56 is sent to the curtailment module 26, the message or information relating to the message may be displayed to the user on a display 88. A typical display used is an LCD. Other output devices may also be used. For example, a speaker for voice messages to the user could be used, a printer may also be used to print information for the user. In addition, the curtailment module 26 may not directly present information to the user but may send information to another device for presenting the information to the user. For example, the curtailment module 26 may send information to a telephone (not shown), a television (not shown), a personal computer (not shown), etc., for that particular device to present the information to the user.

The embodiments disclosed herein may be used to send curtailment messages 40, 56 that relate to temperature control. Those skilled in the art will appreciate, however, that curtailment messages 40, 56 could be sent regarding other resources such as overall power used, water used, telephone usage, etc. Depending upon the type of resource being curtailed, the curtailment module 26 may be in electronic communication with various kinds of devices. For temperature control, the curtailment module 26 may include an interface 90 for the temperature control device 28. This interface 90 is used to establish electronic communications with the temperature control device 28, which may be a thermostat (not shown).

For the embodiment used for temperature control by interfacing with a thermostat, the particular design of the interface 90 will depend upon the capabilities and/or functionality of the thermostat. The curtailment module 26 monitors the settings and/or readings of the thermostat in order to be able to verify that any curtailments were or were not followed. For a particular thermostat's specifications, those skilled in the art would appreciate how to communicate with the thermostat.

Alternatively, and as shown in FIG. 2, the curtailment module 26 and the temperature control device 28 may be combined to form a combination temperature control device with curtailment module 32. If a combination module 32 were used, an interface 90 for the temperature controller may not be needed because of the integration of the two components.

Figure 10:
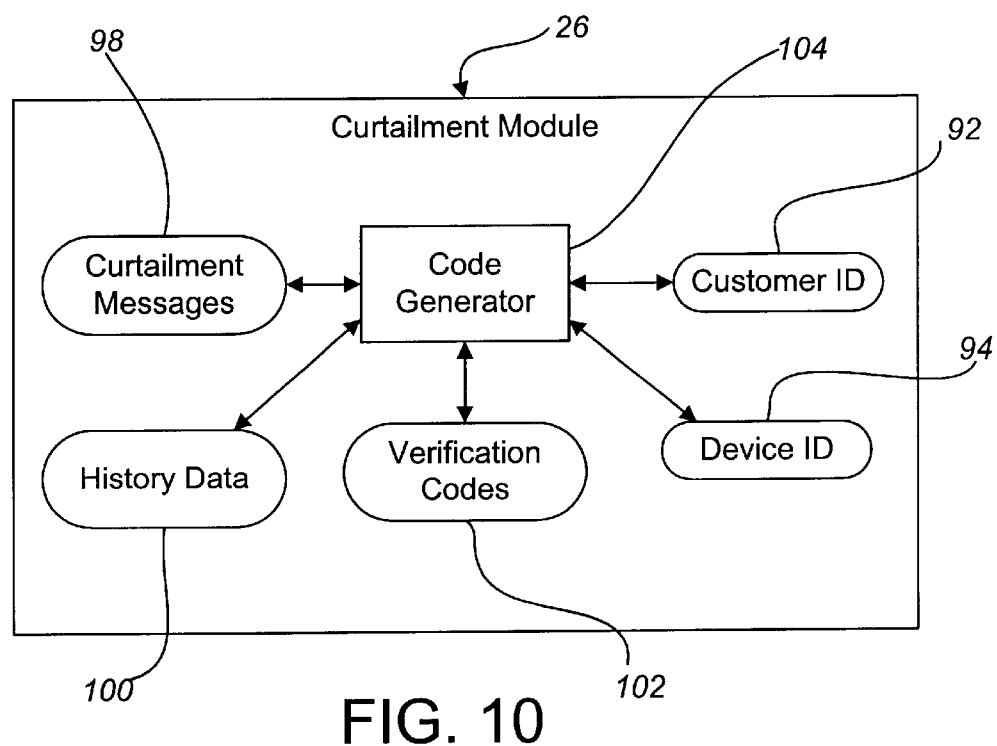
FIG. 10 is a block diagram illustrating software components of an embodiment of a curtailment module.

FIG. 10 is a block diagram illustrating software components of an embodiment of a curtailment module 26. Although the items of FIG. 10 are described as being software components, it will be appreciated that hardware components may be substituted for various software components. In addition, some hardware components may be achieved through software components.

A customer identification 92 may be stored in memory 80 to identify the customer. A device identification 94 may be stored to identify the curtailment module 26 being used. In addition, the curtailment messages 98 may be stored by the curtailment module 26. Depending upon the number of messages 98 being received, and depending upon the amount of memory 80 available, either all of the messages 98 may be stored or only a certain number of messages 98 may be stored.

The past settings of the temperature control device 28, as well as the past readings of the temperature control device 28, may be stored in history data 100. For example, the temperature reading at periodic intervals may be stored for later use. In addition, the user's settings of the desired temperature may also be stored. Through use of the curtailment messages 98 and of the history data 100, a verification code 102 or codes 102 may be generated.

Energy provider's 24 may offer savings or credits to users if they curtail as requested. For user's to get the savings or credits, they may be instructed to contact their energy provider 24 through some means and report to their provider 24 the verification code(s) 102. The user may make a telephone call to the provider 24 to request the savings, or the user may send an e-mail to a particular address requesting the savings, or the user may complete an online form to receive the savings, etc. The verification code(s) 102 are used by the energy provider 24 to verify whether the user actually did curtail as instructed or requested.

The code generater 104 generates the verification code(s) 102 based on the user's inputs to the curtailment module 26 and to the temperature control device 28. For example, if a curtailment message 98 indicated to the user to reduce the temperature setting on the user's thermostat by two percent between 2 p.m and 5 p.m., the code generator 104, using the history data 100, would generate a code 102 that would indicate to the energy provider 24 whether the user actually reduced the temperature setting by two percent for the three hours requested.

The code generator 104 is a function that takes inputs and generates output. In one embodiment, the code generate 104 may be a hash function. The hash function takes as inputs the curtailment message 98, or parts of the message 98, and the history data 100, or parts of the history data 100, to generate the verification code 102. Of course, other pieces of data may also be used as input parameters to the hash function to generate a verification code 102.

Several different hash functions may be stored by the curtailment module 26. If more than one code generator 104 is available, the verification code 102 may be generated by a particular code generator 104 indicated by a data field in the curtailment message 98.

The code generator 104 may be implemented through various types of functions that produce output. For example, the code generator 104 may include a CRC function (not shown). In addition, the code generator 104 may include a cryptographic function, such as DES.

Figure 11:
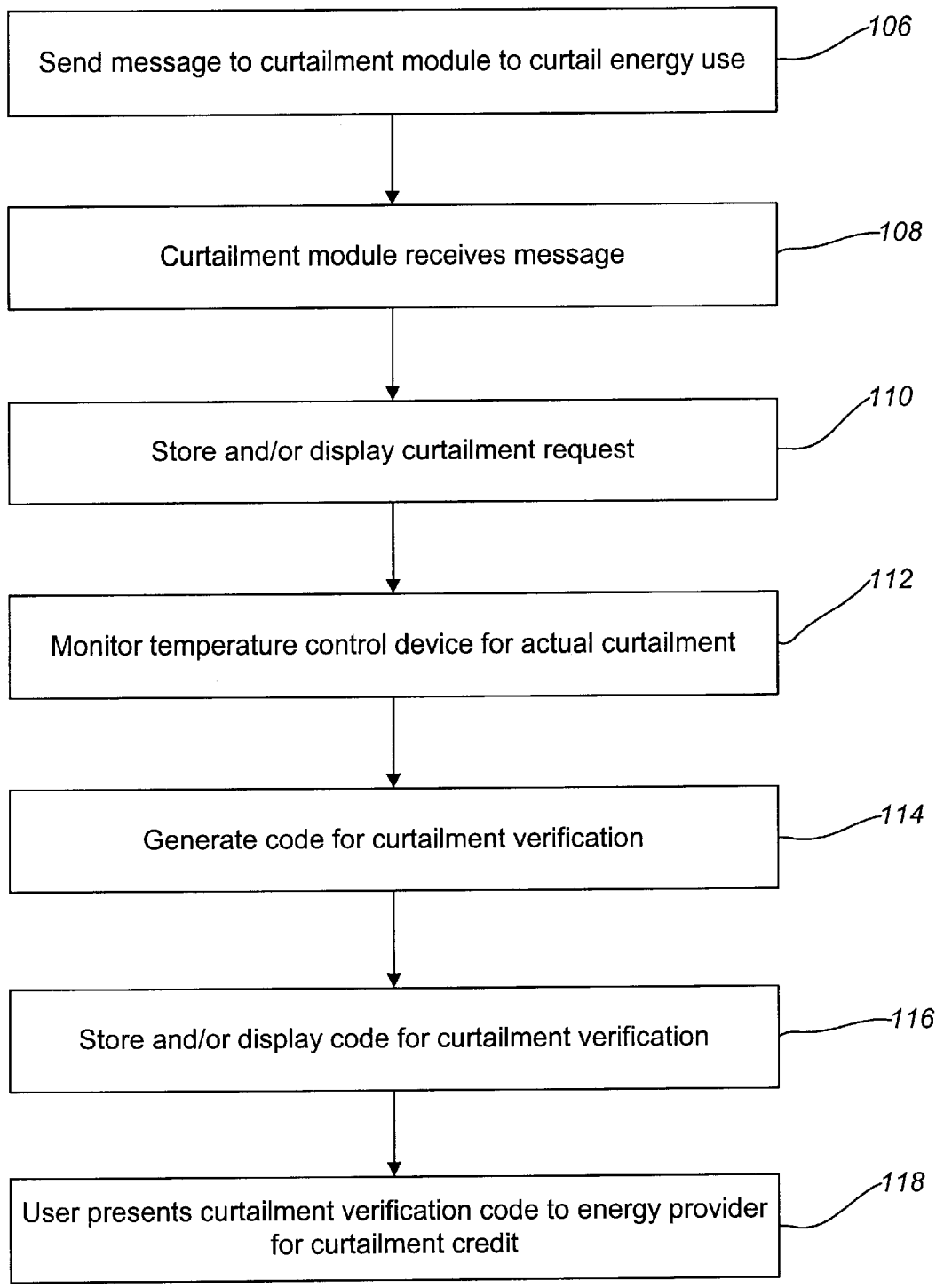
FIG. 11 is a flow diagram of a method for requesting energy curtailment and for verification of the curtailment.

FIG. 11 is a flow diagram of a method for requesting energy curtailment and for verification of the curtailment. An energy provider 24 may send 106 a message to the curtailment module 26 to curtail energy use in some way. The curtailment module 26 receives 108 the message. The curtailment message 40, 56 may be stored 110 and/or displayed 110. The curtailment module 26 monitors 112 the temperature control device 28 for actual curtailment and generates 114 a code 102 for curtailment verification.

Once the code 102 has been generated, the verification code 102 may be stored 116 and/or displayed 116 for use by the user in curtailment verification. To verify curtailment, the user presents 118 the curtailment verification code 102 to the energy provider 24 for any curtailment savings or credit.

Figure 12:
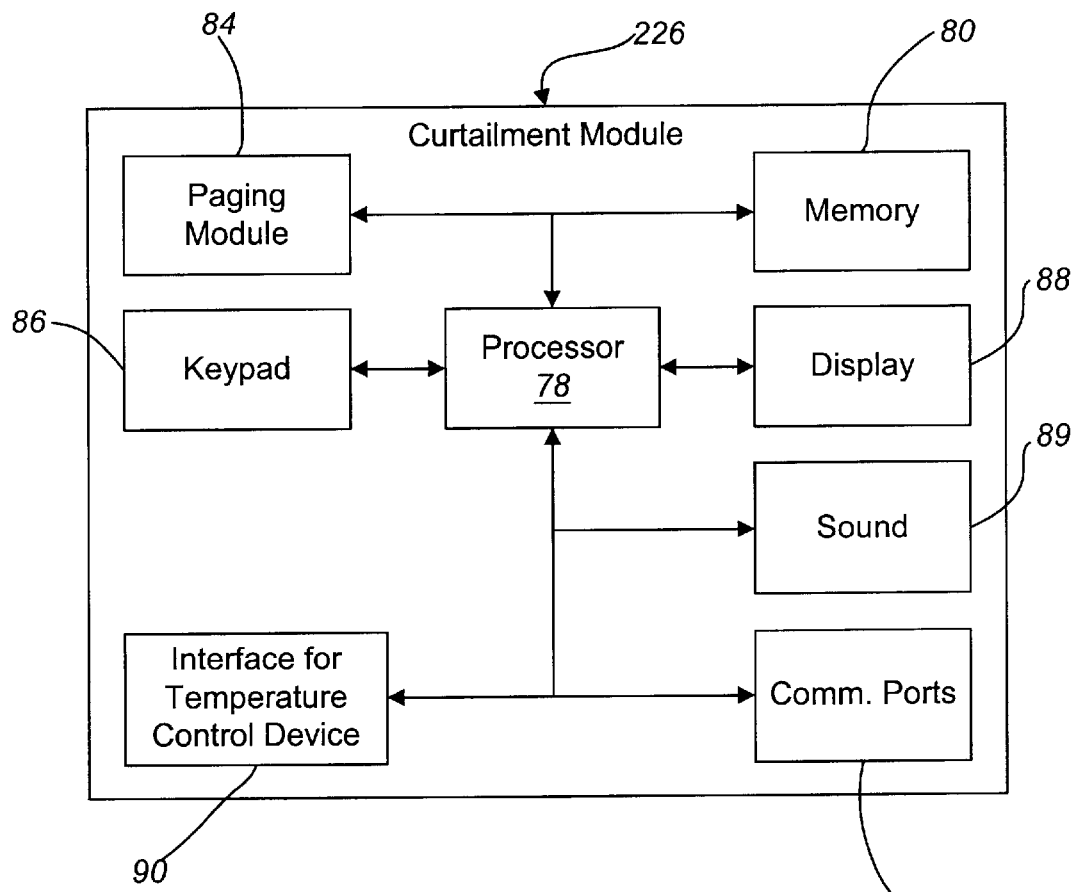
FIG. 12 is a block diagram illustrating hardware components of an embodiment of a curtailment module with a sound component.

FIG. 12 is a block diagram illustrating hardware components of an embodiment of a curtailment module 226 that generates tones or sounds to verify energy curtailment. As shown, the curtailment module 226 includes a several components as shown and described in relation to FIG. 9. In addition to the components described in relation to FIG. 9, the curtailment module 266 includes a sound component 89. The sound component 89 is capable of generating tones or sounds in such a way that curtailment may be verified. With the curtailment module 226 of FIG. 12, the curtailment may be verified through a specific voice message, a specific tone, specific tones, particular frequencies, etc. For example, if a user were to call the energy provider 24 on the telephone to verify energy curtailment for curtailment credit, the user may simply place the microphone portion of the telephone (not shown) near a speaker of the curtailment module 226. The curtailment module 226 may then produce a sound or sounds to verify to the energy provider 24 that the user did or did not curtail his or her energy use. The energy provider 24 may use computer technology to recognize the tone or tones, the tone sequence, etc., to verify curtailment. As a result, the energy provider 24 may use computer technology to automate its processing of curtailment verification requests.

The sound component 89 may be used to generate dual-tone multifrequency ("DTMF") audio signals. There are many commercially available hardware and/or software packages available for interpreting DTMF signals. As a result, the energy provider 24 may simply use commercially available components to interpret the DTMF tones generated by the curtailment module 226. In operation, a user may make a telephone call to the energy provider 24 for curtailment credit. Once so instructed, the user may hold the microphone portion of the telephone next to the curtailment module 226 and simply press a button (not shown) on the keypad 86 to cause a verification sequence of DTMF tones to be generated. From the DTMF signal generated the energy provider 24 may verify whether the user curtailed his or her energy use.

Many commercially available audio or sound components may be used as the sound component 89 of the curtailment module 226. For example, the sound component 89 may be a speaker with a driving circuit. The sound component 89 may also be a sound card with a speaker jack to which speakers may be attached. Further, the sound component 89 may be an integrated circuit capable of producing sound. Those skilled in the art will appreciate the commercially available sound components 89 that may be utilized with the curtailment module 226 to produce sound to verify energy curtailment.

The software components illustrated in FIG. 10 may also be used with the curtailment module 226 of FIG. 12. With the additional sound capability, the verification code(s) 102 may include a sound component as part of the code 102 or as an equivalent code. The code generator 104 that generates the verification code(s) 102 may also generate a sound component of the verification code 102. For example, part of the verification code 102 may be used to identify a particular tone or tones to generate for an audio verification of curtailment. Alternatively, the entire verification code 102 may be used to determine a tone or tones. For example, the verification code 102 may be broken up into smaller components where each smaller component's value corresponded to a particular tone or tones. Thus, the verification code 102 may have an equivalent sound that may be generated on the sound component 89.

Figure 13:
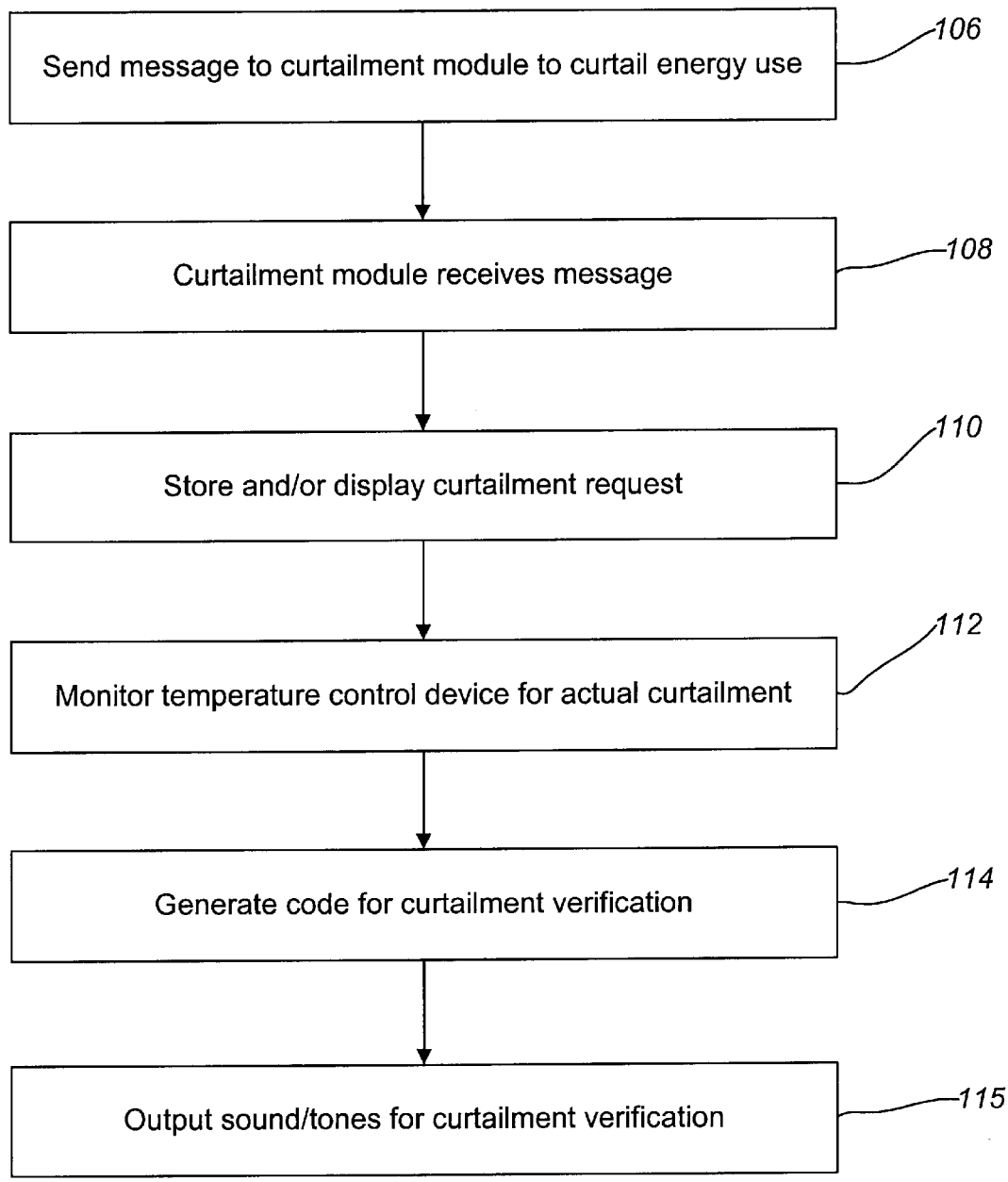
FIG. 13 is a flow diagram of a method for requesting energy curtailment and for verification of the curtailment through use of a sound component.

FIG. 13 is a flow diagram of a method for requesting energy curtailment and for verification of the curtailment through use of a sound component 89. An energy provider 24 may send 106 a message to the curtailment module 26 to curtail energy use in some way. The curtailment module 26 receives 108 the message. The curtailment message 40, 56 may be stored 110 and/or displayed 110. The curtailment module 26 monitors 112 the temperature control device 28 for actual curtailment and generates 114 a code 102 for curtailment verification.

Once the code 102 has been generated, the verification code 102 may be output 115 for use by the user in curtailment verification. To verify curtailment, the user allows the sound(s)/tone(s) to be output such that the energy provider 24 may hear the sound(s)/tone(s) and verify any curtailment for curtailment savings or credit.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A curtailment module for enabling an energy provider to send a request to curtail energy use to a user, the curtailment module comprising:

an interface for electronic communications with a temperature control device;

a paging module for receiving the request from the energy provider through a paging network;

a processor in electronic communication with the paging module for receiving the request from the paging module;

a sound component in electronic communication with the processor for outputting an audio verification;

memory in electronic communication with the processor for storing a curtailment message and history data; and a code generator stored in the memory and executable by the processor to generate a verification code using the curtailment message and the history data as inputs, the code generator also generating the audio verification based on the verification code to verify compliance with the request, wherein a user manually communicates the audio verification to the energy provider.

2. The curtailment module as defined in claim 1 wherein the memory is programmed with instructions to cause the curtailment module to receive the request from the energy provider.

3. The curtailment module as defined in claim 1 wherein the memory is programmed with instructions for communicating with the temperature control device.

4. The curtailment module as defined in claim 1 further comprising a display in electronic communication with the processor.

5. The curtailment module as defined in claim 1 further comprising an input device in electronic communication with the processor for enabling the user to enter a user input.

6. The curtailment module as defined in claim 1 wherein the memory is programmed with instructions to cause the processor to store the history data relating to the temperature control device in the memory.

7. The curtailment module as defined in claim 1, wherein the code generator uses a device ID in generating the verification code.

8. The curtailment module as defined in claim 1, wherein the sound component comprises a speaker and wherein the code generator causes audio verification sound to be output through the speaker.

9. The curtailment module as defined in claim 1, wherein the sound component comprises a speaker and wherein the code generator causes DTMF sound to be output through the speaker.

10. The curtailment module as defined in claim 1, wherein the code generator further displays the verification code on a display after generating the verification code.

11. A curtailment module for enabling an energy provider to send a curtailment message to a remote structure, the curtailment module comprising:

an interface for electronic communications with a temperature control device;

a paging module for receiving the curtailment message from the energy provider through a paging network;

a processor in electronic communication with the paging module for receiving the curtailment message from the paging module;

a sound component in electronic communication with the processor for outputting an audio verification;

memory in electronic communication with the processor for storing the curtailment message and history data;

a code generator stored in the memory and executable by the processor to generate a verification code using the curtailment message and the history data as inputs, the code generator also generating the audio verification based on the verification code, wherein a user manually communicates the audio verification to the energy provider;

a display in electronic communication with the processor for outputting information to a user; and an input device in electronic communication with the processor for enabling the user to enter a user input.

12. The curtailment module as defined in claim 11, wherein the memory is programmed with communication instructions for communicating with the temperature control device and for monitoring settings of the temperature control device.

13. The curtailment module as defined in claim 12, wherein the memory is programmed with history instructions for storing the history data relating to the temperature control device.

14. The curtailment module as defined in claim 13, wherein the sound component comprises a speaker and wherein the code generator causes audio verification sound to be output through the speaker when a user enters the user input to the input device.

15. The curtailment module as defined in claim 14 wherein the memory is programmed with display instructions to display the verification code on the display.

16. A curtailment module for enabling an energy provider to send a curtailment message to a remote structure, the curtailment module comprising:

means for interfacing the curtailment module with a temperature control device;

means for receiving the curtailment message from the energy provider through a paging network;

means for processing, the processing means being in electronic communication with the receiving means for receiving the curtailment message;

memory in electronic communication with the processing means, the memory being programmed with verification instructions to generate a verification code to verify compliance with the curtailment message;

means for generating an audio verification based on the verification code coupled to the processing means, wherein a user manually communicates the audio verification to the energy provider;

means for displaying information to a user coupled to the processing means; and means for inputting by the user coupled to the processing means, the inputting means enabling the user to enter a user input.

17. The curtailment module as defined in claim 16 wherein the memory is programmed with communication instructions for communicating with the temperature control device and for monitoring settings of the temperature control device.

18. The curtailment module as defined in claim 17 wherein the memory is programmed with history instructions for storing history data relating to the temperature control device.

19. The curtailment module as defined in claim 18 wherein the verification instructions use the history data and the curtailment message and a device ID.

20. A method for requesting that energy use be curtailed at a structure and for verifying curtailment, the method comprising:

creating a curtailment message to send to the structure;

sending the curtailment message to the structure through a pager network;

receiving the curtailment message by a curtailment module at the structure;

displaying the curtailment message at the structure;

monitoring a temperature control device in electronic communication with the curtailment module;

saving history data that relates to settings from the temperature control device;

generating a verification code that verifies compliance with the curtailment message;

generating an audio verification based on the verification code, wherein a user manually communicates the audio verification to an energy provider; and displaying the verification code at the structure for the user.

21. The method as defined in claim 20 further comprising using the history data, the curtailment message and a device ID in generating the verification code.

22. A combination temperature-control curtailment module for enabling an energy provider to send a curtailment message to a remote structure, the temperature-control curtailment module comprising:

a temperature control module for controlling the temperature of the remote structure;

a paging module for receiving the curtailment message from the energy provider through a paging network;

a processor in electronic communication with the paging module for receiving the curtailment message from the paging module;

a sound component in electronic communication with the processor for outputting an audio verification;

memory in electronic communication with the processor for storing the curtailment message and history data;

a code generator stored in the memory and executable by the processor to generate a verification code using the curtailment message and the history data as inputs, the code generator also generating the audio verification based on the verification code, wherein a user manually communicates the audio verification to the energy provider;

a display in electronic communication with the processor for outputting information to a user; and an input device in electronic communication with the processor for enabling the user to enter a user input.

23. The temperature-control curtailment module as defined in claim 22 wherein the memory is programmed with communication instructions for communicating with the temperature control module and for monitoring settings of the temperature control module.

24. The temperature-control curtailment module as defined in claim 23 wherein the memory is programmed with history instructions for storing the history data relating to the temperature control module.

25. The temperature-control curtailment module as defined in claim 24 wherein the sound component comprises a speaker and wherein the code generator causes audio verification sound to be output through the speaker when a user enters the user input to the input device.

26. The temperature-control curtailment module as defined in claim 25 wherein the memory is programmed with display instructions to display the verification code on the display.

* * * * *